No. 765,650. PATENTED JULY 19, 1904.
L. A. CASGRAIN.
REEL FOR HOLDING WIRE IN MACHINES FOR INSERTING FASTENINGS.
APPLICATION FILED MAY 14, 1902.
NO MODEL.
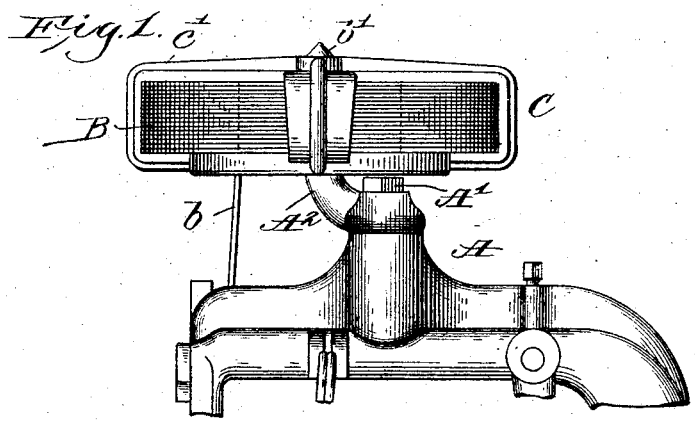
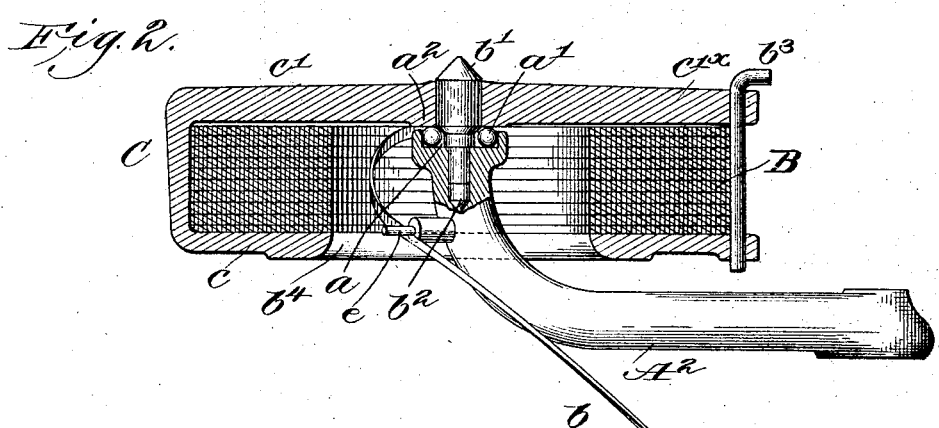
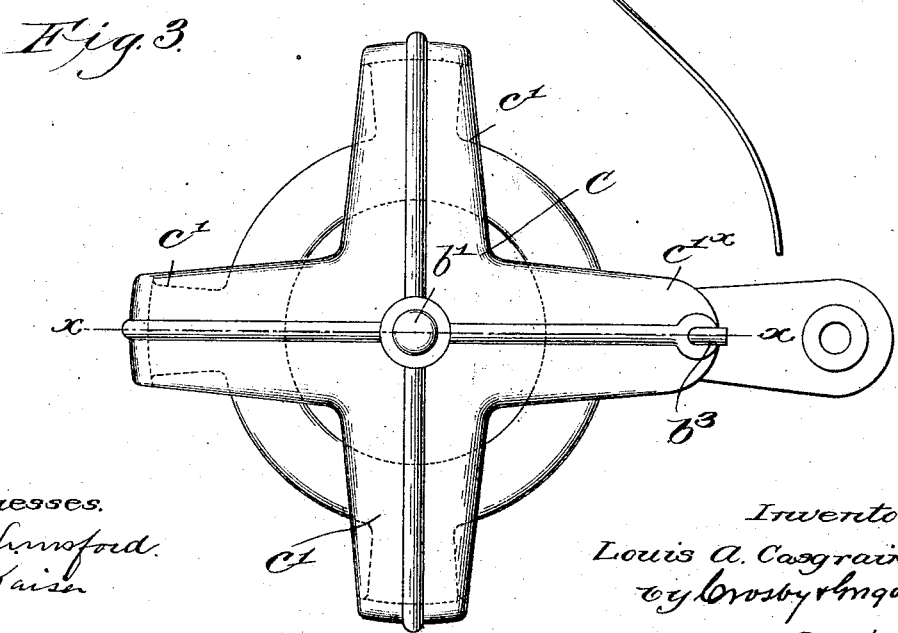
Witnesses.
W. C. Lunsford
A. H. Kaiser
Inventor,
Louis A. Casgrain,
by Crosby & Gregory
atty's.

No. 765,650. Patented July 19, 1904.

UNITED STATES PATENT OFFICE.

LOUIS A. CASGRAIN, OF WINCHESTER, MASSACHUSETTS, ASSIGNOR TO UNITED SHOE MACHINERY COMPANY, OF PATERSON, NEW JERSEY, AND BOSTON, MASSACHUSETTS, A CORPORATION OF NEW JERSEY.

REEL FOR HOLDING WIRE IN MACHINES FOR INSERTING FASTENINGS.

SPECIFICATION forming part of Letters Patent No. 765,650, dated July 19, 1904.

Original application filed December 18, 1895, Serial No. 572,492. Divided and this application filed May 14, 1902. Serial No. 107,304. (No model.)

*To all whom it may concern:*

Be it known that I, LOUIS A. CASGRAIN, a citizen of the United States, residing at Winchester, in the county of Middlesex and State of Massachusetts, have invented an Improvement in Reels for Holding Wire in Machines for Inserting Fastenings, of which the following description, in connection with the accompanying drawings, is a specification, like letters on the drawings representing like parts.

This invention relates to a novel reel for holding wire or similar material. The reel is particularly designed for holding wire which is to be formed into fastenings or slugs and inserted into stock.

The improved reel embodying the preferred form of my invention is rotatable freely about a central support. One side has a central opening to permit the wire or like material to be drawn from the inside of the coil when feeding it to the machine in which it is made into fastenings. The rotation of the reel and coil while the wire is being unwound prevents the wire being twisted between the reel and the free end of the wire held in the usual wire-cutting and fastening-driving mechanisms. This reel is shown in operative connection with a machine for inserting metallic fastenings in my application, Serial No. 572,492, for nailing-machine, filed December 18, 1895, from which application this present application is a division.

Figure 1 is a side elevation of the reel and part of the head of a machine for inserting fastenings. Fig. 2 is an enlarged sectional view of the reel on the line $x\,x$, Fig. 3; and Fig. 3 is a plan view of the reel and its support.

Referring to the drawings, A represents part of the head of a machine for inserting fastenings. This head has rigidly secured to it by a screw $A'$ an arm $A^2$, represented as upturned near its outer end and cupped at said end, as at $a$, (see Fig. 2,) to form an annular race to receive a series of antifriction-rollers $a'$, upon which rests the central part or hub $a^2$ of the reel C, containing the wire or like material $b$. The reel is centered and guided in its rotation by a pivot-pin $b'$, extended loosely through the center or hub of the reel into a suitable hole $b^2$ in the end of the arm $A^2$.

As herein shown, the reel C consists of an annular bottom plate $c$ and a series of arms $c'$, radiating from the top part of the hub of the reel and downturned at their ends to meet the plate $c$, the reel being shown as a single casting. One of the arms, as $c'^\times$, is unconnected to the bottom plate, thereby leaving a peripheral opening through which the coil B of wire or like material $b$ is inserted to rest upon the bottom plate $c$. A removable pin $b^3$ prevents the escape of the coil laterally through said opening in the reel. The wire is drawn from the interior of the coil through the open center $b^4$ of the plate $c$ and in contact with a fixed guide $e$, which causes the reel to rotate freely in a horizontal plane about its vertical axis. The guide while preventing the wire from twisting also applies the strain exerted on the wire to unwind the same in such direction as to insure the rotation of the wire coil and with it the reel. To obtain the most satisfactory results, I preferably locate this guide eccentrically to the reel.

It will be noticed that the wire coil herein illustrated is wound to leave an open center, and the successive layers or portions of wire are wound from the top to the bottom of the reel, and vice versa, until the desired size of coil is obtained, and as the wire coil is being unwound each layer extending from the top to the bottom of the reel is drawn off easily and having been detached from the position in which it was wound does not act frictionally against the wire of any other layer, as would be the case if the wire were unwound from outside of the coil through the center of the coil.

The pivot-pin $b'$ is secured in the upper end of the supporting-arm $A^2$ and projects up into the upper plate $c'$. The said end of the supporting-arm occupies a position within the open center $b^4$ of the reel, and the upper plate of the reel bears directly on said support.

This insures a steadiness of rotation of the reel, and the interposition of the balls or antifriction means between the reel and the bearing and the pin so sustains the reel that all rubbing friction in starting and moving the reel is overcome, so that the reel is moved intermittingly with a minimum strain when the wire is pulled upon intermittingly as the end of the wire is fed and cut off in the formation of fastenings.

Having described my invention, what I claim as new, and desire to secure by Letters Patent, is—

1. In a device of the class described, a support, having a bearing, and a reel, adapted to receive a coil of wire or like material, suspended at its upper part from said bearing, and being out of contact with said support or bearing except at the upper part of the reel, said reel being arranged to rotate freely upon the bearing in substantially a horizontal plane as said material is drawn off, whereby twisting of the material is avoided.

2. A reel, comprising a top plate and an open-centered bottom plate, a support extending through but out of contact with said open-centered bottom plate and forming a rest for said top plate, and a pivotal connection between said support and said top plate to permit rotation of said reel in a horizontal plane.

3. In a device of the class described, an upturned support, a reel adapted to receive a coil of wire or like material and to rotate freely in a horizontal plane, and a bearing between the support and the under side of the reel-top, to suspend the latter, the bottom of the reel having a central opening through which said support is extended and the wire or like material is drawn from the interior of the coil, substantially as described.

4. A device of the class described, comprising a reel provided with a top plate, a pivotal support for said top plate, and a bottom plate having an opening for the wire.

5. A device of the class described, comprising a support and a reel, rotatable in a horizontal plane and suspended at its upper part from said support, the lower part of said reel being out of contact with said support.

6. A device of the class described, comprising a rotatable reel for a coil of wire having an opening for the passage of the wire, said opening being inside of the coil on said reel, and a stationary guide for the wire located eccentrically to the reel.

7. A reel comprising a top plate and an open-centered bottom plate to sustain a coil of wire, a pivotal support to sustain the top plate of the reel while the latter is being rotated by the strain on the wire being unwound, and a guide to sustain the wire as it leaves the reel, said guide causing the strain on the wire to rotate the reel.

8. A reel comprising a top plate and an open-centered bottom plate, means rigidly and permanently connecting said plates, and a removable member in engagement with said plates, withdrawal of the removable member permitting the insertion within the reel of an open-centered coil of wire to be sustained by said bottom plate.

9. A reel comprising a top plate and an open-centered bottom plate, said reel having provision for permitting the insertion of a coil of wire through its side, in combination with means for closing the side of the reel to prevent the escape of the coil.

In testimony whereof I have signed my name to this specification in the presence of two subscribing witnesses.

LOUIS A. CASGRAIN.

Witnesses:
GEO. W. GREGORY,
EDITH M. STODDARD.